April 18, 1967 T. FINKELSTEIN 3,314,602
GAS MILEAGE CALCULATOR
Filed Aug. 23, 1965 2 Sheets-Sheet 2
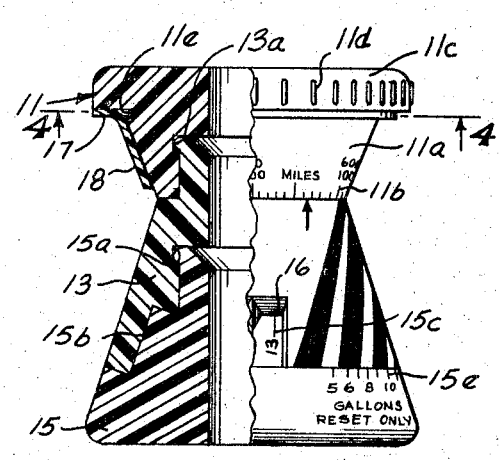
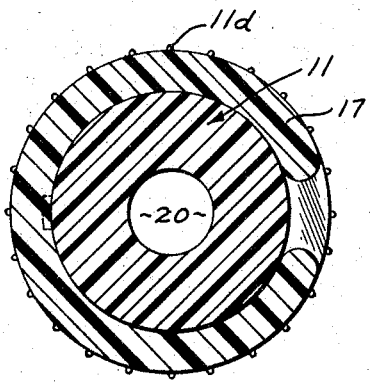
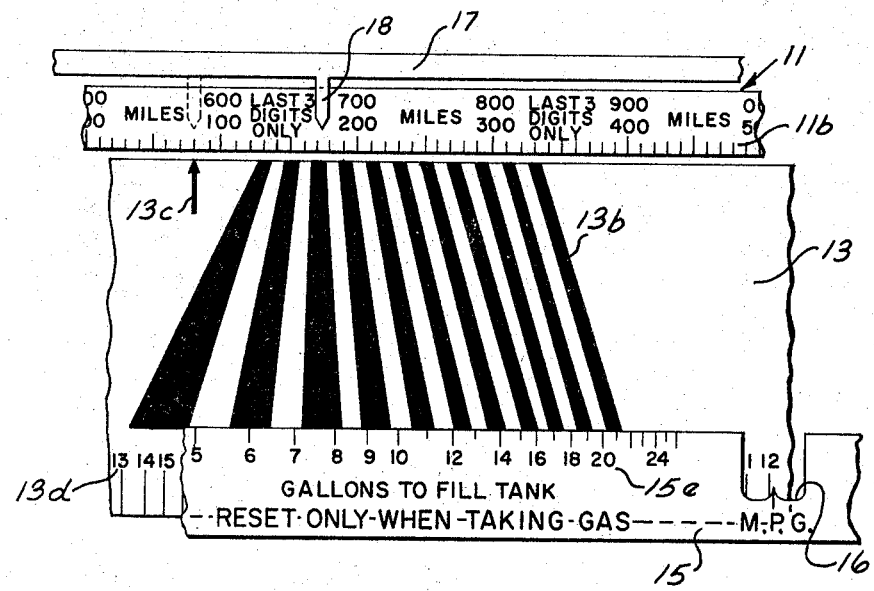
INVENTOR.
THEODOR FINKELSTEIN
BY
ATTORNEY

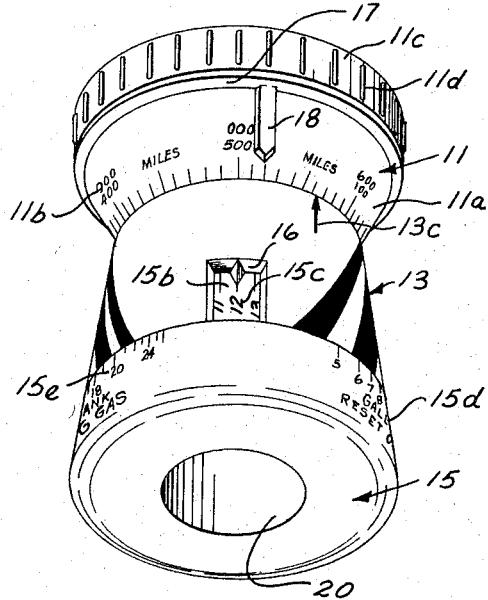

United States Patent Office 3,314,602
Patented Apr. 18, 1967

3,314,602
GAS MILEAGE CALCULATOR
Theodor Finkelstein, 23140 Erwin St.,
Woodland Hills, Calif. 91364
Filed Aug. 23, 1965, Ser. No. 481,465
9 Claims. (Cl. 235—61)

This invention relates to a gas mileage calculator and more particularly to a device for computing the operational efficiency in terms of the miles per gallon of fuel attained in the operation of a motor vehicle.

It is desirable in the operation of a motor vehicle to regularly ascertain the fuel efficiency of such vehicle. Such information is valuable to the motorist in determining faulty operation, such as, for example might be caused by a faulty spark plug or a carburetor failure, and also provides a check on driving habits which may result in inefficient consumption of fuel. Further, especially in the case of newly purchased vehicles, motorists like to have information on gas consumption to evaluate performance.

The normal method for computing gas mileage involves the notation of odometer readings on successive occasions when the gas tank is replenished and finding the quotient of the difference between successive readings and the number of gallons required to fill the tank by long division. This is complicated and time consuming.

Calculators have been devised for making some of these operations easier, or for performing separately some or all of the three operations required, namely, retention of last reading, subtraction from new reading, and finally division. Many of these prior art devices are circular slide rules in the form of flat rotatable disc members printed on cardboard. These prior art devices are not as simple to utilize as would be desired. First, they rely on the memory of the user. Further, with most of these devices one has to perform one or two of the three operations separately. Even the most advanced types of such prior art devices require that information be transferred by the operator from one pointer position to another. This, while a relatively simple operation, leads to the possibility that such information might be forgotten or erroneously transferred, should the operator be momentarily interrupted, as might well be the case while stopping in a service station.

The device of this invention overcomes the short-comings of prior art gas mileage calculators in providing a simple device with which gas mileage can be accurately computed without the necessity of maintaining a written record of the last mileage reading. Furthermore, in the operation of the device no memorization of figures is required, or any kind of subsidiary computation, or transfer of readings. The setting is accomplished by virtue of a system of matching pointers. The device of the invention further can be three-dimensional and attractive in appearance, and can be utilized as a key chain fob or a windshield attachment whereby it is immediately available for use at all times.

The device of this invention comprises a plurality of scale and pointer members which are attached together for rotation relative to each other. These members are generally in the form of solids of revolution, to form an integral unit having a cylindrical centrally located hollow core and a circular outer wall surface. An endless linear scale is utilized to designate the miles travelled. Subtraction and the retention of the last mileage reading are accomplished on this scale by means of a movable pointer and a stationary mark on an adjacent member. Separate logarithmic scales are utilized to designate the gallons required to fill the gas tank and the miles travelled per gallon, respectively. A series of variable width channels on one of the members is used to convert the linear scale reading of miles to a logarithmic scale reading. In setting the device up for a new reading, it is only necessary to match up an arrow on one member with an indexing pointer carried on a ring member which is adapted to move with the linear scale member.

The device of this invention thus provides a relatively simple three-dimensional device, having high aesthetic qualities, for computing the gas mileage.

It is therefore an object of this invention to provide an improved gas mileage calculator.

It is a further object of this invention to provide a gas mileage calculator which has a built-in memory capability and is simpler to utilize than prior art devices.

It is still a further object of this invention to provide an improved gas mileage calculator which has high aesthetic qualities.

It is still another object of this invention to provide a gas mileage calculator in three-dimensional form which is suitable for use as a key chain fob or a windshield attachment.

Other objects of this invention will become apparent from the following description taken in connection with the accompanying drawings, of which FIG. 1 is a perspective view of a preferred embodiment of the device of the invention, FIG. 2 is a schematic drawing illustrating the operation of the preferred embodiment of the device of the invention, FIG. 3 is an elevation view partially in cross section of the preferred embodiment of the device of the invention, FIG. 4 is a cross sectional view as taken along the plane indicated by 4—4 in FIG. 3, and FIG. 5 is a schematic drawing illustrating the operation of a second embodiment of the device of the invention.

Referring now to FIGS. 1-4, a first embodiment of the device of the invention is illustrated. A first scale member 11 has a conical portion 11a with an endless linear scale 11b, representing miles marked thereon, and a cylindrical portion 11c having ridges 11d formed thereon for finger grips. The linear scale 11b is graduated in 500 equal parts and marked for the two coincident ranges 0–500 and 500–1000 miles respectively. Scale member 11 is preferably fabricated of resilient material, such as plastic, and is rotatably attached to the nomographic conversion member 13 in frictional engagement with a snap-on fit over ridge portion 13a of member 13. There is just sufficient friction to hold the two members in any given relationship without inadvertent slippage, but not as much as would prevent manual resetting to a new position. The nomographic conversion member 13 is substantially in the shape of a frustrum of a cone and has a window 16 formed therein through which a reading on scale 15c is visible.

This nomographic conversion member has a series of variable width channels 13b alternately of a dark and a light color. One set of ends of these channels are in alignment with, and of equal width to the scale divisions of linear scale 11b. The other set of ends are in alignment with and have a width equal to corresponding logarithmic divisions of scale 15e. The nomographic conversion scale 13b converts the linear mileage scale readings 11b from linear to logarithmic form.

The second scale member 15 is similarly snapped onto the nomographic conversion member 13 with ridged portion 15a providing the holding action. The second scale member 15 has an inner stepped portion 15b on which a logarithmic scale 15c, representing miles per gallon, is marked. The second scale member 15 further has an outer portion 15d, having a logarithmic scale 15e, representing the gallons required to fill the tank marked thereon. Ring member 17 has an integral pointer 18 which indexes with a reading on scale 11b and is snapped into place in groove 11e formed in scale member 11. Ring member 17 is substantially C-shaped and frictionally holds to scale member 11 so that it travels with this scale member when it is rotated, yet can be moved relative to scale member 11 to make independent settings. Thus, scale members 11 and 15, conversion member 13 and ring member 17 are all joined together in relatively rotatable concentric relaitonship.

The two scale members and the conversion member have hollow centers so that the finally assembled unit has a hollow centrally located aperture 20 formed therein, this aperture facilitating the attachment of the device to a key chain or the like. The two scale members and the conversion member are preferably fabricated of a resilient material such as a suitable plastic, which will permit ready assembly thereof in snap-on relationship and will provide relative rotation of the various scales with the desired amount of friction therebetween. The ring member 17 may be made of sheet metal or a transparent plastic.

When using the device, it is necessary always to fill the gas tank to full capacity and only change the setting when the gas tank is filled.

Referring now to FIG. 2, the operation of the preferred embodiment of the device of the invention is illustrated. When making a computation, the initial setting of the indexing pointer 18 is at the last three digits of the odometer reading from the last time the gas tank was filled. Three successive movements of the members are needed. Scale member 11 is first rotated so that the arrow 13c which is marked on conversion member 13 is located opposite index 18 and the scale reading of scale 11b that corresponds to the last three digits indicated on the automobile odometer when the gas tank was last filled. As shown in FIG. 2, opposite the dashed outline of index 18 this setting is "080," corresponding to any mileage reading with 080 as the last three digits. Two sets of scale numbers are provided so that all possible alternative settings are covered. For the second successive step of the computation, the index 18 of ring member 17 is set to the last three digits of the odometer reading. In the example shown, this reading is indicated as "176." The second scale member 15 is then rotated so that the number on scale 15e, which corresponds to the number of gallons it takes to fill the tank, is opposite the portion of the closest conversion channel 13b, which runs up to a point opposite pointer 18 on scale 11b. As shown in FIG. 2, the number of gallons required to fill the tank is "7.8." The number of miles per gallon which appears on scale 15c in window 16, opposite index 16a, is "12.3," thus providing the desired computation.

The device is then left in this position until the gas tank is next filled. The device is always set for a subsequent computation because index 18 is aligned with the last odometer reading. This in effect provides a memory of the last reading without any mental calculations or memorization by the operator, but merely by the matching of a pair of indexing arrows. Thus, the necessity of transferring memorized information, as is the case with prior art devices, is obviated, assuring accurate readings and minimizing the effort required by the operator.

While in the first embodiment of the device of the invention the "Miles per Gallon" readout scale 15c is carried on scale member 15 and window 16 and index 16a on the conversion grid member 13, the locations of the scale and the window can be reversed, placing the former on the conversion grid member 13 and the latter on the scale member 15.

Referring now to FIG. 5, a second embodiment of the device of the invention along these lines is illustrated. The embodiment of FIG. 5 is similar to that of the first embodiment just described, except for the fact that the miles per gallon scale (now indicated at 13d) is marked on scale member 13 which also carries the conversion grid channels 13b. The readout window 16 is formed in scale member 15. The device is operated in the same manner as described in connection with FIG. 2. To clearly illustrate such operation, the second embodiment as illustrated in FIG. 5 is set up to compute the same problem shown and described in connection with FIG. 2. The second embodiment works equally well in the first, the choice of one or the other mechanizations being dependent upon factors dictated by fabrication and assembly demands.

The device of the invention thus provides simple yet accurate means for computing gas mileage. The device of the invention is in a highly attractive form suitable for attachment to a key chain or to the windshield where it is ready for immediate use. A memory capability is built into the device so that no data has to be memorized or noted. Furthermore, operation is by matching indices, rather than setting memorized readings, so there is little likelihood of errors of computation which might occur where information has to be mentally transferred from one point to another.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A device for calculating the fuel efficiency of a vehicle having a fuel tank, comprising
   a first scale member having a linear scale marked thereon representing distance,
   a second scale member having a logarithmic scale marked thereon representing the amount of fuel required to fill the vehicle fuel tank,
   a conversion grid member having a series of substantially straight edge and varying width channels marked thereon for converting the readings on said first scale member from linear to logarithmic form, said channels being alternately of a dark and light color,
   said first and second scale members being mounted independently rotatable relative to said conversion grid member,
   one of said conversion grid member and said second scale member having a logarithmic scale marked thereon representing the fuel efficiency, and
   an indexing pointer member movably mounted on said first scale member, said pointer member being mounted to frictionally hold to said first member and rotate with it when said first member is rotated.

2. The device as recited in claim 1 wherein said first and second scale members and said conversion grid member are mounted in concentric relationship to each other.

3. The device as recited in claim 1 wherein the logarithmic scale representing fuel efficiency is marked on said second scale member.

4. The device as recited in claim 1 wherein the logarithmic scale representing fuel efficiency is marked on said conversion grid member.

5. A device for calculating the fuel efficiency of a vehicle having a fuel tank, comprising
   a first scale member in the form of a solid of revolution having a linear scale marked thereon representing distance,
   a second scale member in the form of a solid of revolution having a logarithmic scale marked thereon representing the amount of fuel required to fill the fuel tank,
   a conversion grid member in the form of a solid of revolution having a series of channels marked thereon for converting the readings on said first scale member from linear to logarithmic form,
   the axes of symmetry of the solids of revolution of said first and second scale members and said conversion grid member being co-linear,
   one of said second scale member and conversion grid member having a logarithmic scale marked thereon representing units of distance per unit of fuel, and
   a ring member having an indicia pointer thereon rotatably mounted on said first scale member, said first and second scale members and said conversion grid member being rotatably mounted relative to each other in concentric relationship for rotation about their respective axes of symmetry, said first and second scale members being snap-fitted on said conversion grid member in intermeshing relationship therewith.

6. The device as recited in claim 5 wherein said ring member is mounted on said first scale member to frictionally hold thereto when said first scale member is rotated.

7. The device as recited in claim 5 wherein said scale members and said conversion grid member have a substantially washer shaped transverse cross-section thereby forming an aperture running through the entire longitudinal extent of said device suitable for receiving a key chain.

8. A device for calculating the gas mileage of a vehicle having a gas tank, comprising
- a first scale member in the form of a solid of revolution having a linear scale marked thereon representing miles,
- a second scale member in the form of a solid of revolution having a logarithmic scale marked thereon representing the gallons required to fill the gas tank,
- a conversion grid member in the form of a solid of revolution having a series of varying width channels marked thereon for converting the readings on said first scale member from linear to logarithmic form, said channels being alternately of a dark and light color,
- said second scale member having a logarithmic scale marked thereon representing miles per gallon,
- an indexing pointer member rotatably mounted on said first scale member, said pointer member being mounted on said first scale member to frictionally hold thereto and rotate therewith when said first member is rotated, said members being rotatably mounted relative to each other in concentric relationship, said first and second scale members being snap-fitted on said conversion grid member, said members each having a substantially washer-shaped transverse cross section thereby forming an aperture running through the entire longitudinal extent of said device suitable for receiving a key chain.

9. The device as recited in claim 8 wherein said conversion grid member has an aperture formed therein to enable a readout of miles per gallon from said second scale member.

References Cited by the Examiner

UNITED STATES PATENTS

| | | | |
|---|---|---|---|
| 1,507,333 | 9/1924 | Carroll | 235—84 |
| 2,034,027 | 3/1936 | Decary et al. | 235—79.5 X |
| 2,080,857 | 5/1937 | Baer | 235—84 X |
| 2,288,561 | 6/1942 | Webber | 235—87 X |
| 2,661,900 | 12/1953 | Pastorius | 235—74 |
| 2,665,062 | 1/1954 | Adler | 235—87 |
| 2,772,052 | 11/1956 | Studebaker | 235—84 |
| 2,821,953 | 2/1958 | Langbart et al. | 235—117.1 |
| 2,990,115 | 6/1961 | Conklin | 235—79.5 |
| 2,996,246 | 8/1961 | Swanson | 235—83 |

RICHARD B. WILKINSON, *Primary Examiner.*

W. BAUER, *Assistant Examiner.*